Aug. 10, 1954   D. F. WALKER ET AL   2,686,222
ELECTRIC SIGNAL TRANSLATING AND RECORDING DEVICE
Filed Feb. 14, 1952                              9 Sheets-Sheet 1

INVENTOR
Donald Ferguson Walker
Maurice Kenyon Taylor
BY
Cushman, Darby & Cushman
ATTORNEY

Aug. 10, 1954  D. F. WALKER ET AL  2,686,222
ELECTRIC SIGNAL TRANSLATING AND RECORDING DEVICE
Filed Feb. 14, 1952  9 Sheets-Sheet 4

Aug. 10, 1954  D. F. WALKER ET AL  2,686,222
ELECTRIC SIGNAL TRANSLATING AND RECORDING DEVICE
Filed Feb. 14, 1952  9 Sheets-Sheet 8

INVENTOR
ATTORNEY

Aug. 10, 1954     D. F. WALKER ET AL     2,686,222
ELECTRIC SIGNAL TRANSLATING AND RECORDING DEVICE
Filed Feb. 14, 1952                              9 Sheets-Sheet 9

Patented Aug. 10, 1954

2,686,222

UNITED STATES PATENT OFFICE 2,686,222

ELECTRIC SIGNAL TRANSLATING AND RECORDING DEVICE

Donald F. Walker, Edinburgh, Scotland, and Maurice K. Taylor, Downsview, Ontario, Canada, assignors to Ferranti Limited, Hollinwood, England, a British company Application February 14, 1952, Serial No. 271,488

Claims priority, application Great Britain February 16, 1951

23 Claims. (Cl. 178—19)

This invention relates primarily to signal translating devices for deriving a response which is individual to any one of a series of N numbers from signals which represent by separate characteristics the component powers of digits of that number expressed in a predetermined scale of notation of radix $n$ but it also extends to electrical recording devices by which such response may be recorded in a permanent visible manner.

In the co-pending patent application of Taylor, Serial No. 261,523 filed December 13, 1951, there is described and claimed a "Positional Data Transmitting System" for transmitting to some distant place data indicating the position of an object with respect to a reference system of two intersecting families of curves, said system including coding means and a signal translating or decoding means.

In the co-pending patent application of Taylor, Serial No. 265,460 filed January 8, 1952, entitled "Indicating Apparatus," which is a continuation-in-part of the co-pending patent application No. 261,523 above referred to there is described and claimed coding means suitable for use in the "Positional Data Transmitting System" of the aforesaid patent application No. 261,523.

One object of the present invention is the provision of signal translating devices or decoding means suitable for use with the "Positional Data Transmitting System" claimed in patent application Serial No. 261,523, and for use with the coding means claimed in patent application Serial No. 265,460, although the present invention is not limited to such use and other fields of use of the invention are possible.

Another object of the invention is to provide a signal translating device of this kind which is of improved and simple character.

Another object of the present invention is to provide a signal translating device for deriving a response which is individual to any one of a series of N numbers from signals which represent by separate characteristics the component powers of digits of that number when expressed in a predetermined scale of notation of radix $n$ and which includes a layered assembly of power-representing plates of insulating material, there being one plate layer for each power of said scale required for the representation of all said numbers and each plate layer having $n$ different digit-representing dispositions, disposition-adjusting means for each plate layer for causing each component of said signals which represents a digit to adjust to the disposition representing that digit the particular plate layer which represents the power of which that digit is the multiple thus to allow each of said numbers to be represented by a different one of N different combinations of said positions of said plate layers, in each of said plates a plurality of apertures so located with respect to the apertures in the adjacent plate layer or layers that each of said combinations defines through successive apertures, one in each plate layer, a single spark-discharge path individual to that combination and deemed to represent the number represented by that combination, and means whereby the setting up of each spark-discharge path by said signals completes an electrical circuit for giving an indication of, or a response individual to, the number represented by that path.

Another object of the invention is to provide apparatus as set forth in the immediately preceding paragraph but modified in that there is provided between at least two adjacent ones of said power-representing plate layers, at least one group of convergent conductors so disposed relative to the apertures in said adjacent plate layers as to form part of the discharge paths through any one of a predetermined number of holes in one of said two adjacent plate layers and to combine such discharge paths into one passing through one hole in the remaining one of said two adjacent plate layers.

Yet another object of the invention is to provide apparatus as set forth in either of the two preceding paragraphs but modified in that each power-representing plate layer is replaced by a power-representing cylinder layer each of which cylinder layer has $n$ different digit-representing dispositions. Such different dispositions are conveniently provided by different angular positions of each cylinder (which term is intended to include a part-cylinder).

Still a further object of the invention is to provide an electrical recording device for recording the position of a point or an object with reference to a reference system of two intersecting families of curves each of which families is defined by a group of conductors whose selective energisation is controlled by a signal translating device as described above.

Still a further object of the invention is to provide an electrical recording device for recording the position of a point or an object with reference to a reference system of two intersecting families of curves and comprising a grid-like assembly of two arrays of electrical conductors shaped and positioned to represent respectively said two families of curves, means for energising simultaneously those two of said conductors, one in each array, which represent the curves whose intersection defines the position of the point or object to be recorded and, disposed in close relationship to and coinciding with the area of intersection of said two arrays of conductors, a sheet of responsive material so constituted as to react visibly in response to the energisation of any two of said conductors one in each array, such reaction being confined to the immediate vicinity of the point of intersection of said conductors.

In order that the above and other objects and features of the invention may be more readily understood a number of embodiments thereof will now be described with reference to the accompanying drawings in which.

The invention will first be described, by way of example, in connection with its application to a positional data transmitting system of the kind set forth in the copending U. S. A. patent application, entitled "Positional Data Transmitting System" by M. K. Taylor, Serial No. 261,523, filed December 13, 1951. This system is for the purpose of transmitting to some distant place data indicating the position of an object or point with respect to a reference system comprising two intersecting families of curves. In the embodiment illustrated the reference system is a plane rectangular grid and the data items transmitted are accordingly the rectangular co-ordinates of an object or point with respect to such system.

Figure 1:
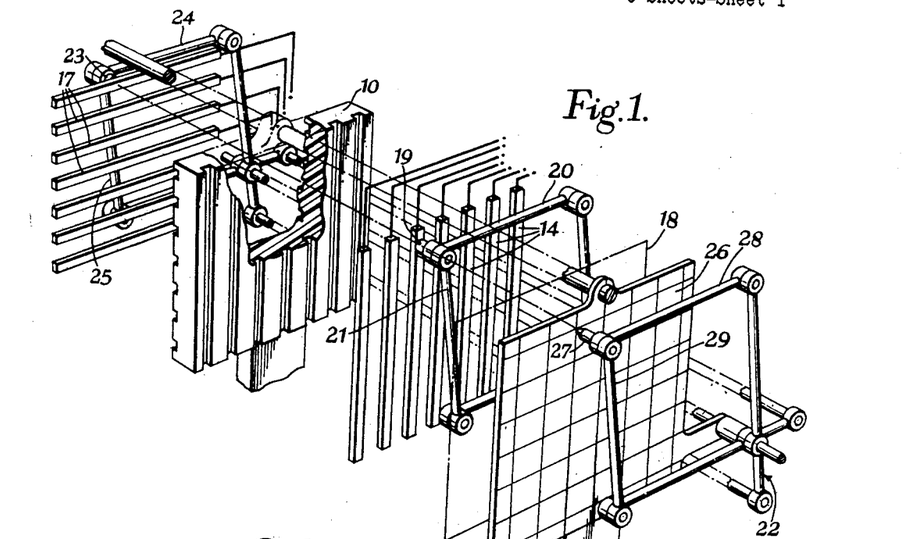
Fig. 1 is an exploded perspective view of the transmitter of a positional data transmitting system which embodies signal translating and recording devices in accordance with the present invention.

Referring now to Fig. 1 the transmitter device comprises a stationary rectangular sheet of insulation material 10 in one face of which is partially embedded a first set of straight rod conductors 14 lying normal to the $x$ axis of the grid and hereinafter referred to as the $x$ conductors, since each one represents a constant value of $x$ for different values of $y$. In the other face of the sheet 10 are partially embedded a second set of straight rod conductors 17 lying normal to the $y$ axis and, for similar reasons, hereinafter referred to as the $y$ conductors. Each conductor extends the full width or length of the reference system area indicated by the rectangle 18 and is insulated from all other conductors. Although the two sets of conductors are not actually in the same plane they nevertheless form a grid-like assembly of conductors and represent respectively the two families of curves which constitute the reference system. It will be noted that the term "curve" has here the special sense of a straight line.

The $x$ set of conductors 14 has associated therewith a single movable contact 19 carried by arms 20, 21 of a pantograph lever system 22 in such manner that the contact is movable to engage the exposed surface of any one of the $x$ conductors 14 along any part of its length within the reference area. The $y$ conductors 17 are similarly engageable by a second movable contact 23 carried by a second pair of arms 24, 25 of the same pantograph lever system 22, while a third pair of arms 28, 29 of the same system carries a stylus 27 which is manually movable over any part of the surface of an engraved chart 26 carrying a representation of the reference grid system. The arms of the pantograph lever system 22 are so interlinked mechanically that the stylus 27 and the contacts 19, 23 are always in alignment so that movement of the stylus to any chosen point on the reference grid on the chart causes the contacts to move to the respective $x$ and $y$ conductors appropriate to the co-ordinates of that point. The contacts 19, 23 are electrically interconnected so that the respective $x$ and $y$ conductors which are engaged by the contacts at any moment are effective electrically connected in series by them.

Figure 2:
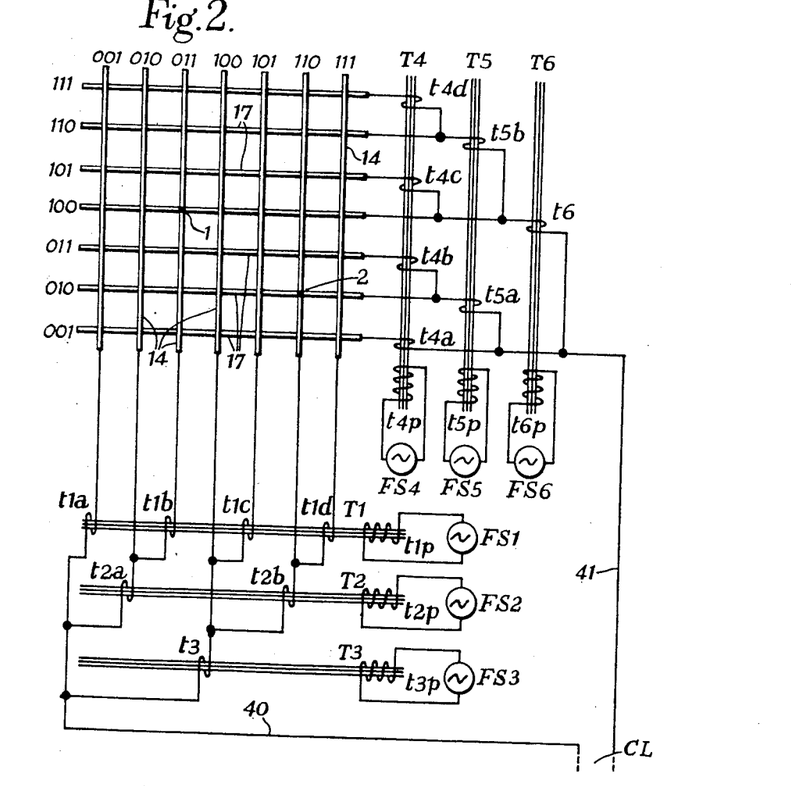
Fig. 2 is a schematic circuit diagram of a signal coding arrangement associated with the transmitter of Fig. 1.

As will be apparent later, the effect of engagement of the contacts 19, 23 with any two conductors is to allow energisation of those conductors and suitable apparatus for deriving from such energisation, signals which are representative of those two conductors is shown in Fig. 2 and is of the type more fully described and claimed in the aforesaid copending U. S. A. patent application No. 265,460. In this figure, to accord with the showing of Fig. 1, it is assumed there are only seven conductors in each of the $x$ and $y$ sets of conductors but it will, of course, be appreciated that in practice many more conductors are usually necessary.

Referring to Fig. 2, there are associated with the $x$ conductors 14, first, second and third transformers T1, T2 and T3 having primary windings $t1p$, $t2p$ and $t3p$ respectively which may be described as power-representing windings representing respectively the successive ascending powers of the binary scale $2^0$, $2^1$ and $2^2$. These primary or power-representing windings are respectively energised continuously at distinctively different frequencies $f1$, $f2$ and $f3$ c./s. by sources FS1, FS2 and FS3.

The transformer T1($2^0$) has four digit-representing secondary windings $t1a$, $t1b$, $t1c$ and $t1d$, the transformer T2($2^1$) has two similar secondary windings $t2a$ and $t2b$ and the transformer T3($2^2$) one similar secondary winding $t3$. The $x$ conductors 14 are deemed to be numbered from 001 to 111 in the binary scale of notation (i. e. 1 to 7 in the decimal scale) and each is connected to a common lead 40 by way of such of the transformer secondary windings, connected in series, as indicated by the power-representing windings coupled to them, the powers required for the representation of the binary number which is allocated to that conductor.

Thus, for example, conductor 001 is connected to the common lead 40 by way of the secondary winding $t1a$ on the first transformer T1($2^0$) only, conductor 010 by way of the secondary winding $t2a$ on the second transformer T2($2^1$) only, conductor 011 by way of a secondary winding $t1b$ on the first transformer T1 and the secondary winding $t2a$ on the second transformer T2 and so on, conductor 111 being connected to the common lead 40 by way of secondary windings $t1d$, $t2b$ and $t3$, one on each transformer.

Generally similar arrangements are provided for the $y$ conductors 17 except that the three transformers T4, T5 and T6 involved have their primary or power-representing windings $t4p$, $t5p$ and $t6p$ energised at further distinctively different frequencies $f4$, $f5$ and $f6$ c./s. by sources FS4, FS5 and FS6 although they again represent respectively the same binary powers $2^0$, $2^1$ and $2^2$ as in the $x$ conductor arrangement. The $y$ conductors are connected through appropriate ones of the secondary windings $t4a$, $t4b$, $t4c$, $t4d$, $t5a$, $t5b$ and $t6$ to a common lead 41.

The two common leads 40, 41 are connected by way of a convenient communication link CL to the receiver equipment.

When, by means of the movable contacts 19 and 23 (Fig. 1) any $x$ conductor 14 is connected to any $y$ conductor 17, signals are delivered to the communication link CL having frequencies which are representative of the binary numbers of the two conductors involved. Thus, if $x$ conductor 011 is connected to $y$ conductor 100 at the point I the frequencies transmitted will be those of $f1$, $f2$ and $f6$ c./s., whereas if $x$ conductor 110 is connected to $y$ conductor 010 the frequencies transmitted are those of $f2$, $f3$ and $f5$ c./s. and so on.

Figure 3:
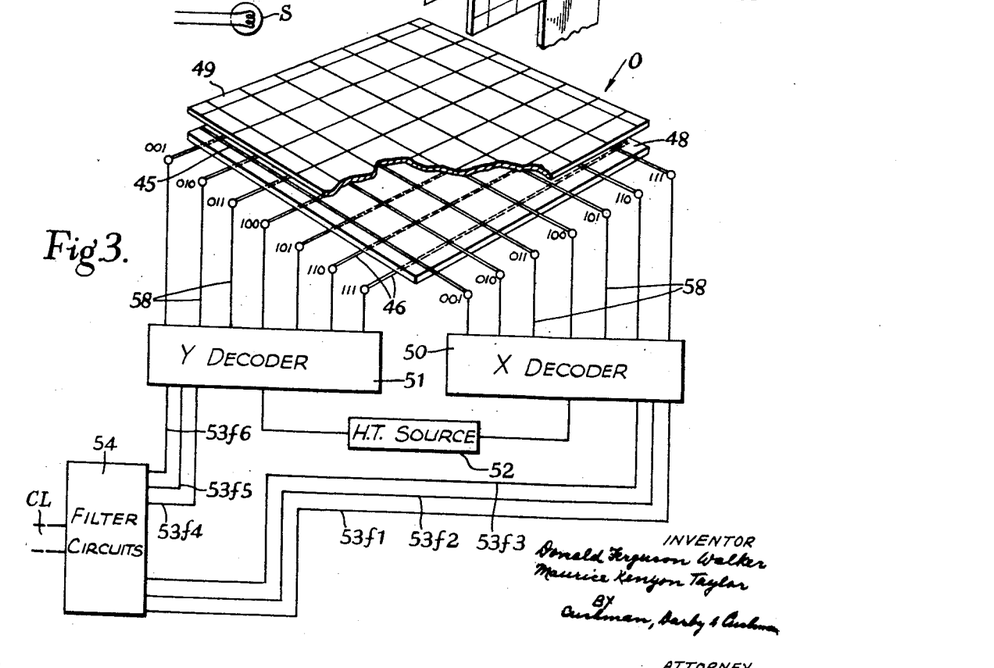
Fig. 3 is a schematic diagram of a suitable receiver arrangement for the system of Figs. 1 and 2 and comprising a recording device in accordance with the invention.

The receiver arrangements with which the present invention is more particularly concerned comprise the apparatus shown in Fig. 3 and consisting of a grid-like arrangement of $x$ and $y$ conductors 45 and 46 whose disposition is such that they represent and are similar in their arrangement to the $x$ and $y$ conductors respectively of the transmitter in that they form an equivalent intersecting family of curves. The two sets of conductors 45, 46 are separated by a sheet 48 of electro-responsive material which may, for example, be a sheet of white waxed paper and the assemblage is viewed from the direction of the arrow O through a transparent chart 49 which is engraved with a suitable version of the reference grid system. In this particular embodiment the upper surface of the sheet 48 is illuminated by an electric lamp S. At least the upper set of conductors 45 and preferably both sets of conductors 45 and 46 are formed as wires of sufficiently fine gauge to allow unobstructed observation of the sheet 48.

The production of an indication at a desired point on the sheet 48 is effected, in this embodiment, by setting up an electric discharge between a selected $x$ conductor 45 and a selected $y$ conductor 46 so that, at the point of intersection of the selected conductors, the wax of the paper is melted by the discharge to cause variation of the degree of opacity of the paper sheet and so to alter its appearance at that point.

The selection of the required conductor in each of the $x$ and $y$ groups is obtained through X and Y signal translating devices or decoders 50 and 51 which, in turn, are controlled in their operation by the nature of the input signals arriving over the communication link CL. The two decoders 50, 51 control the connection of opposite terminals of a source 52 of high tension to the seleced $x$ and $y$ conductors respectively.

The input signals which in the simplified example already used, may comprise up to six different frequencies are applied to a series of filter circuits 54 by which the individual signals corresponding to each of the different transmitter frequencies $f1$, $f2$ ... $f6$ c./s. are segregated into six separate channels 53/1, 53/2 ... 53/6, three of which, 53/1, 53/2 and 53/3, control the X decoder 50 by signals corresponding to the three transmitter frequencies $f1$, $f2$ and $f3$ c./s. and the other three of which 53/4, 53/5 and 53/6 control the Y decoder 51 in accordance with the further transmitter frequencies $f4$, $f5$ and $f6$ c./s.

Figure 4:
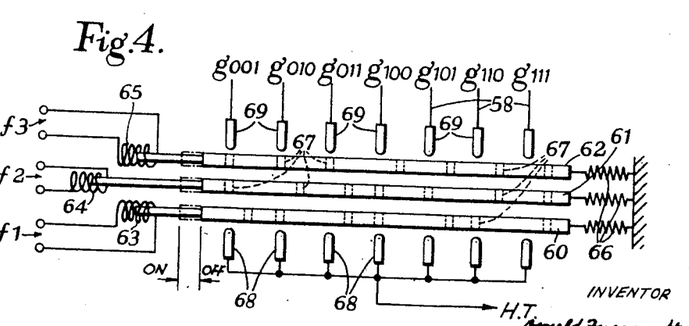
Fig. 4 is a schematic plan view of one form of signal translating device according to the invention and forming part of the receiver arrangement of Fig. 3.
Figure 5:
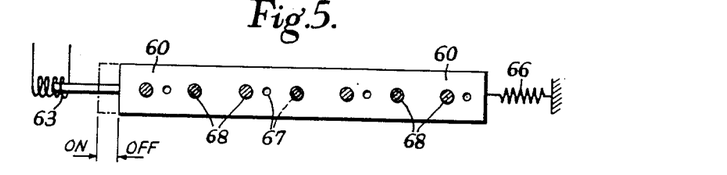
Fig. 5 is a side elevational view of the device of Fig. 4.
Figure 6:
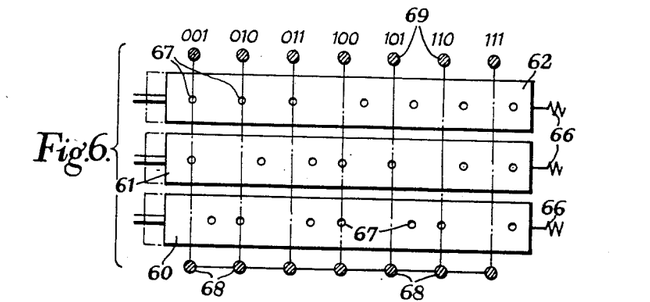
Fig. 6 is a composite developed view of the three separate power-representing plates of the device of Figs. 4 and 5.

One form of the X decoder 50 is shown in Figs. 4, 5 and 6, and comprises a layered assembly of first, second and third plates 60, 61 and 62 of insulating material, conveniently in the form of mica strips, which correspond operatively to the first, second and third transformers at the transmitter and represent respectively the binary powers, $2^0$, $2^1$ and $2^2$. Each plate 60, 61 and 62 has seven apertures 67 formed therein at particular locations along its length which will be defined later. The plates are superposed on each other to form a layered assembly with the second plate 61 sandwiched between the other two. Each plate, which is of rectangular shape, is arranged to be movable lengthwise in its own plane from an "off" or zero digit-representing position as shown in full lines to an "on" or unit digit-representing position shown in chain-dotted lines, by the energisation of electro-magnetic operating means, indicated as solenoids 63, 64 and 65. When any of such solenoids is not energised the associated plate is maintained in its "off" position either by gravity or by means such as springs indicated at 66. The output signals, corresponding to transmitter frequencies $f1$, $f2$ and $f3$, in the channels 53/1, 53/2 and 53/3 (Fig. 3) are used, after any necessary amplification and possible rectification, for the energisation of or for the control of energisation of solenoids 63, 64 and 65, the frequency $f1$ c./s. being responsible for the energisation of solenoid 63, frequency $f2$ c./s. for the energisation of solenoid 64 and frequency $f3$ c./s. for the energisation of solenoid 65.

The layered assembly of mica strips or plates is interposed between the co-operating electrodes of a row of seven separate spark-gaps designated $g001$, $g010$, $g011$, $g100$, $g101$, $g110$ and $g111$ in the binary scale. The electrodes 68 on one side of the strips are commoned and are connected to one terminal of the high-tension supply source 52 (Fig. 3) whereas the other electrodes 69 on the opposite side of the layered strip assembly are each individually connected by leads 58 to the particular $x$ conductor 45 of the receiver arrangement (Fig. 3) which corresponds to the transmitter $x$ conductor having the same binary number as that allotted to the spark gap.

Each of the seven apertures 67 in each plate 60, 61 or 62 is arranged adjacent to one or other of the spark gaps, the exact locations of the apertures being, as shown more clearly in the developed view of the components in Fig. 6, such that when all three plates 60, 61 and 62 are in the "off" or zero digit-representing position no through path is presented by alignment of the apertures 67 in the mica plates at any one of the spark-gaps, each spark-gap being closed by at least one plate. When the first plate 60, controlled by signal frequency $f1$ and corresponding to binary power $2^0$ is moved to the "on" position, the apertures 67 in the three plates become aligned only at the first spark gap $g001$, the remaining gaps being still closed by at least one plate. This gap $g001$ is thereby opened to allow the passage of a spark which accordingly energises the $x$ conductor 001 at the receiver. Similarly, when both first and second plates 60, 61 are moved to the "on" position due to the receipt of each of the signal frequencies $f1$ and $f2$, the only aligned set of apertures 67 through each of the three plates will be that of the gap $g011$ whereby this gap alone is opened and selective energisation of the $x$ conductor 011 is produced. The decoding arrangements accordingly effectively reproduce the binary number of the required conductor in terms of displaced apertured plates, each of the seven separate conductor numbers being represented by a different one of seven distinct combinations of the digit-representing dispositions of the plates and each combination clearly defines, through successive apertures, one in each of the plates, a single spark-discharge path which is individual to that combination and is thus similarly representative of the number that combination represents.

Various systems of apertures may readily be designed to accord with the above requirements. The simplest way to ensure location of the apertures is as follows. The various mica plates are first formed into their layered assembly in unpunched state. Then, whilst the first plate 60 is located in its correct "on" position and the other two plates 61 and 62 are maintained in their correct "off" positions, a hole is punched through all three plates at a position conforming to that of the first of the various spark gaps, i. e. $g001$. Next, while maintaining both first and second plates 60, 61 in their "on" positions and the third plate 62 in its "off" position another hole is punched through all three plates at a position which will register with the second spark-gap $g010$ and is accordingly a spark-discharge path representative of the binary number 011. The remaining holes are punched in similar manner. While it is convenient to locate the through apertures in numerical order along the assembly of plates, this is by no means essential and the apertures may be located in any order and may be spaced irregularly provided not more than one spark-discharge path is defined by the aligned apertures at any one time.

The Y decoder 51 comprises a precisely similar signal translating device with mica strips, associated solenoids or like energising and actuating means and a group of seven separate spark-gaps connected respectively to the $y$ conductors 46 (Fig. 3) numbered 001, 010 . . . 111. The respective solenoids are, of course, energised in this instance in accordance with the presence or absence of signals at the frequencies of $f4$, $f5$ and $f6$ c./s.

The H. T. supply source 52 is one of sufficiently high voltage to ensure the passage of a spark-discharge through each of the X and Y decoder devices and also between the selected $x$ and $y$ receiver conductors 45, 46 at their point of intersection passing en route through the sheet 48 of electro-responsive material.

In the operation of the complete arrangement described it will first be assumed that the transmitter stylus 27 is located outside the reference area 18. In consequence, the contacts 19 and 23 are not in engagement with any of the conductors 14, 17 of the $x$ and $y$ sets and all the secondary windings of transformers T1, T2 . . . T6 are on open circuit and no signal is being delivered to the communication link CL. At the receiver, as there are no input signals, none of the solenoids in either the X decoder 50 or Y decoder 51 will be energised and each of the mica plates in each decoder will be in the "off" position so that all the spark gaps are closed and none of the receiver conductors 45, 46 is energised.

If now stylus 27 is moved to a selected position within the reference area 18 such as, for instance, to represent the position of some object with reference to the co-ordinates of the system, the contacts 19 and 23 now engage respectively with the particular $x$ and $y$ conductors which represent the two co-ordinates of the selected point. As a result of this a circuit is completed between the two common conductors 40, 41 through those of the secondary windings of the transformers which are suited to represent the presence of a "1" digit in the various powers of the binary numbers of the particular conductors concerned and the appropriate combination of frequencies representative of the selected transformers is fed to the communication link CL.

At the receiver, the filter circuits 54 separate the received signals to their appropriate channels 53/1, 53/2 . . . 53/6 for causing the energisation of the related solenoids in the X and Y decoders 50, 51. This causes displacement to the "on" or unit digit-representing position of those mica plates 60, 61, 62 in each decoder which is necessary to set up the two spark-discharge paths which characterise the $x$ and $y$ receiver conductors 45, 46 representing the co-ordinates of the object. A complete circuit thus provided from one pole of the H. T. source 52 by way of the particular opened $x$ spark-gap, the corresponding $x$ receiver conductor 45, a further spark gap through the sheet 48 to the appropriate $y$ receiver conductor 46 and thence by way of the particular opened $y$ spark gap back to the other pole of the source 52.

The passage of the resultant spark through the waxed paper melts the wax over a small area. This increases the translucence of the paper in this area and provides the appearance, to an observer of the illuminated side, of a dark dot on the sheet of otherwise opaque and hence light-reflecting paper. The position of this dot as determined by the co-ordinates engraved on the chart 49 corresponds to the position of the transmitter stylus 27 and so provides the required indication of the transmitted object position. By indicating these co-ordinates the spot gives an indication of the numbers represented by the two spark discharge paths.

As described in the aforesaid copending patent application No. 265,460 it is possible to use a plurality of separate communication channels each operating at a common frequency instead of employing a single channel with a plurality of frequencies for the purpose of transmitting the requisite characterising signals for the $x$ and $y$ conductors involved. With such an arrangement it will obviously not be necessary to provide the receiver with the filter circuits 54 or their equivalent. Where it is desired to reduce the number of communicating channels pulse signals or the like may be derived to represent the individual channels, e. g. on a time division basis, and may be transmitted to the receiver over a signal communicating link using only a single operating frequency.

The above description of one simple application involving the invention is given for illustrative purposes only and it is strongly emphasized that the invention may be used for widely different purposes. For example, it has wider application in less complex form involving only one set of conductors where one selected data item out of a plurality of items is required to be defined. One example of such simplified form is that where it is desired to indicate the angular position of some object with respect to another object or to a given datum position, thus functioning in the manner of a magslip. In a typical arrangement of this kind one set of conductors similar to one of those already referred to in detail, for instance, the $x$ set is constituted by a set of fixed contacts or studs arranged in a circular path and traversed by a common slider, the knowledge of the angular position of which constitutes the required information which is to be transmitted. The various studs are allotted different characterising numbers in similar manner to that already described and are then connected to the various power-representing transformers so that each stud is connected to a common lead by way of a sufficient number of secondary windings as will be required to indicate the various powers used for the representation of the binary number allotted to this stud. The other common lead is connected to the slider.

The single decoder used can be exactly similar to the decoder already described in detail except that the external connections therefrom instead of leading to individual conductors of a family of intersecting conductors may be led to a circular arrangement of neon lamps or other means capable of providing an indication when the discharge path associated therewith is set up by the appropriate displacement of the mica plates.

In the arrangements described above no signals are transmitted in respect of those powers which are not required for representation of the particular conductor number concerned. In other words, the zero digit for any power is represented by a zero signal. As a zero signal may in some cases arise due to a fault in either the transmitter or the receiver apparatus it is normally preferable to transmit zero digits by a definite signal. Means for doing this are described in the aforesaid copending patent application No. 265,460 while the following is a description of an embodiment of a decoder or signal translating device according to the present invention capable of handling signals which are representative of zero digits as well as the other unit digits required.

Figure 7:
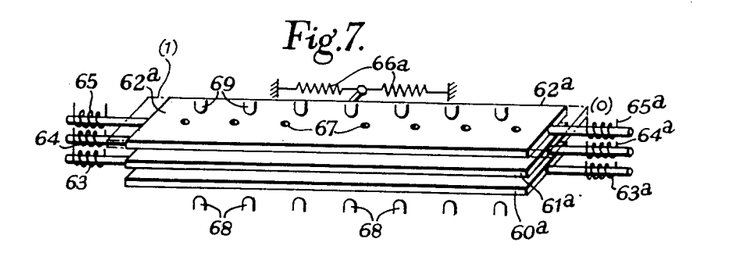
Fig. 7 is a perspective and partly diagrammatic view of an alternative form of signal translating device according to the invention.
Figure 8:
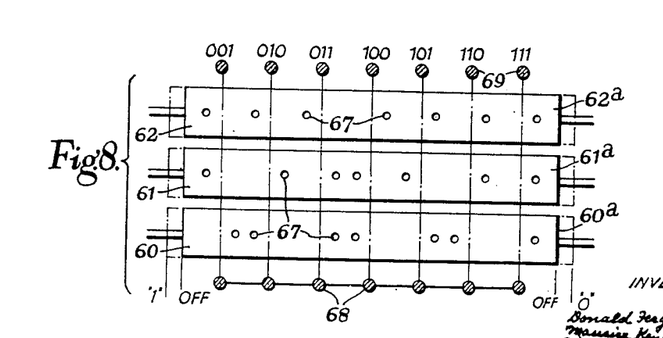
Fig. 8 is a composite developed view, similar to Fig. 6 of the plates of Fig. 7.

It will be assumed that the receiver apparatus preceding the device described is capable of segregating the received signals into appropriate channels characteristic of both the zero and unit signals for each of the powers employed. For instance the filter circuits 54 (Fig. 3) may be designed to handle twice the number of signal frequencies, two for each of the binary powers required for any one set of conductors. It will also be assumed, for simplicity, that there are again only seven numbers to be represented. In this case the decoder arrangement may be as illustrated in Figs. 7 and 8, comprising, as before, a layered assembly of three power-representing mica plates 60$^a$, 61$^a$ and 62$^a$ each of which is punched at spaced positions along its length with seven apertures 67. In this embodiment, however, instead of having only two alternative dispositions in its own plane and in the direction of its own length each plate is now capable of assuming any one of three different positions, two representing respectively the zero (0) and unit (1) binary digits and the third, an "off" position, which is located in between the other two. In this embodiment a solenoid or like electro-magnetic device 63, 64 or 65 is provided at one end of each plate, for moving that plate from its mid or "off" position into its "1" representing position (i. e. to the left in Figs. 7 and 8) while another solenoid or like device 63$^a$, 64$^a$ or 65$^a$ is provided at the opposite end of each plate for moving that plate to its other or "0" representing position. A two-way restoring spring 66$^a$ serves to locate each plate in the mid or "off" position when neither solenoid is energised. The apertures 67 provided in each plate may be formed by the method already described, the plates being this time moved to their appropriate zero or unit digit positions when each through hole is punched. With this arrangement a through passage between any one pair of spark gap electrodes 68, 69 is provided only when each of the plates is moved in one or the other of its opposite directions. When any plate is left in its mid or "off" position all of the available spark-gap paths will be blocked by at least that plate thereby preventing any display in the event of a fault by which no signal is available on any one or more of the signal channels.

In practice many more numbers than seven are usually required to be represented and additional powers above $2^2$ are therefore required. When such is the case the provision of adequate spacing of the apertures 67 lengthwise along the decoder plates when these are in the form of strips may necessitate the provision of elements of inconvenient length. As an alternative to this each plate may be given an approximately square shape and the various holes located therein in a two-dimensional manner.

Figures 9, 11:
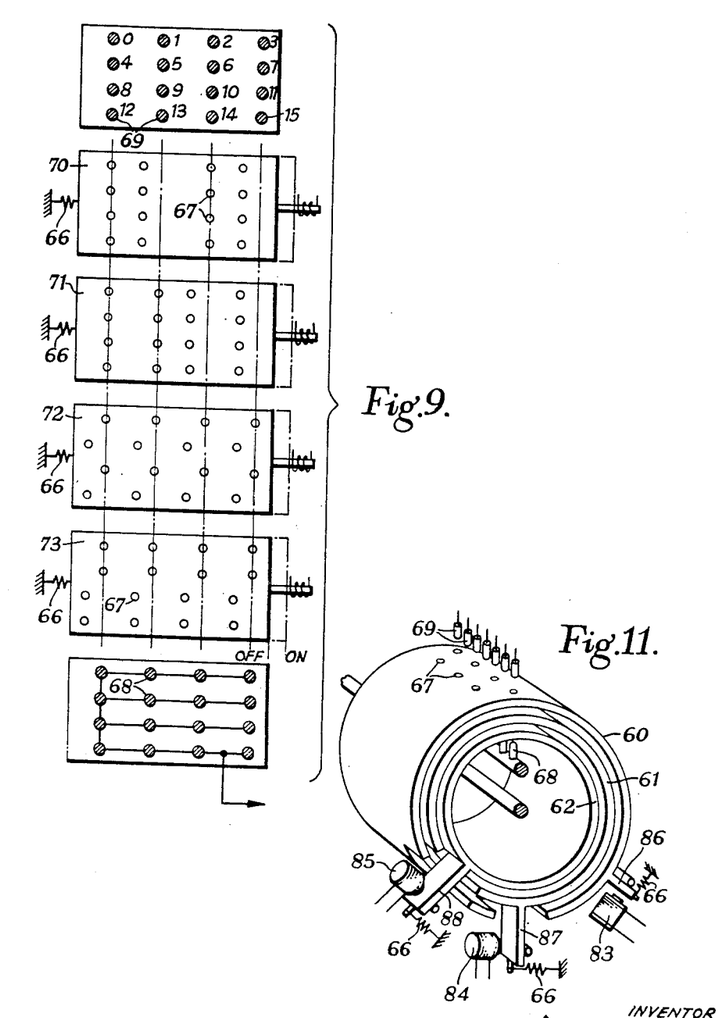
Fig. 9 is a developed elevational view of a modified construction of decoding device.
Fig. 11 is a perspective view of a modified form of construction for the power-representing plates.

Fig. 9 illustrates one embodiment of this type having a capacity of 16 conductors or numbers and involving the signalling of the binary powers $2^0$, $2^1$, $2^2$, and $2^3$. The form of the various mica plates 70, 71, 72 and 73 associated with each binary power will be evident from the displaced showing thereof in the drawing and as the equipment is otherwise exactly as before it will not be further described. This particular embodiment like that of Figs. 1 to 6 does not employ positive signalling of the zero digit but the alterations to effect positive signalling of the zero digit will be self-apparent.

The various plates or strips need not be arranged in close parallel association with each other as already shown. Alternatively, any adjacent pair of plates may be widely separated and the intermediate space bridged by conductors which form part of the respective discharge paths. Such conductors may be embedded in a layer of insulation separating the two plates. With such an arrangement there may be provided a conductor individual to each discharge path but on the other hand, considerable economy of apertures and conductors may be effected by combining discharge paths at each power level by means of these conductors and thereby progressively reducing the number of apertures which need be formed in the various movable plates.

Figure 10:
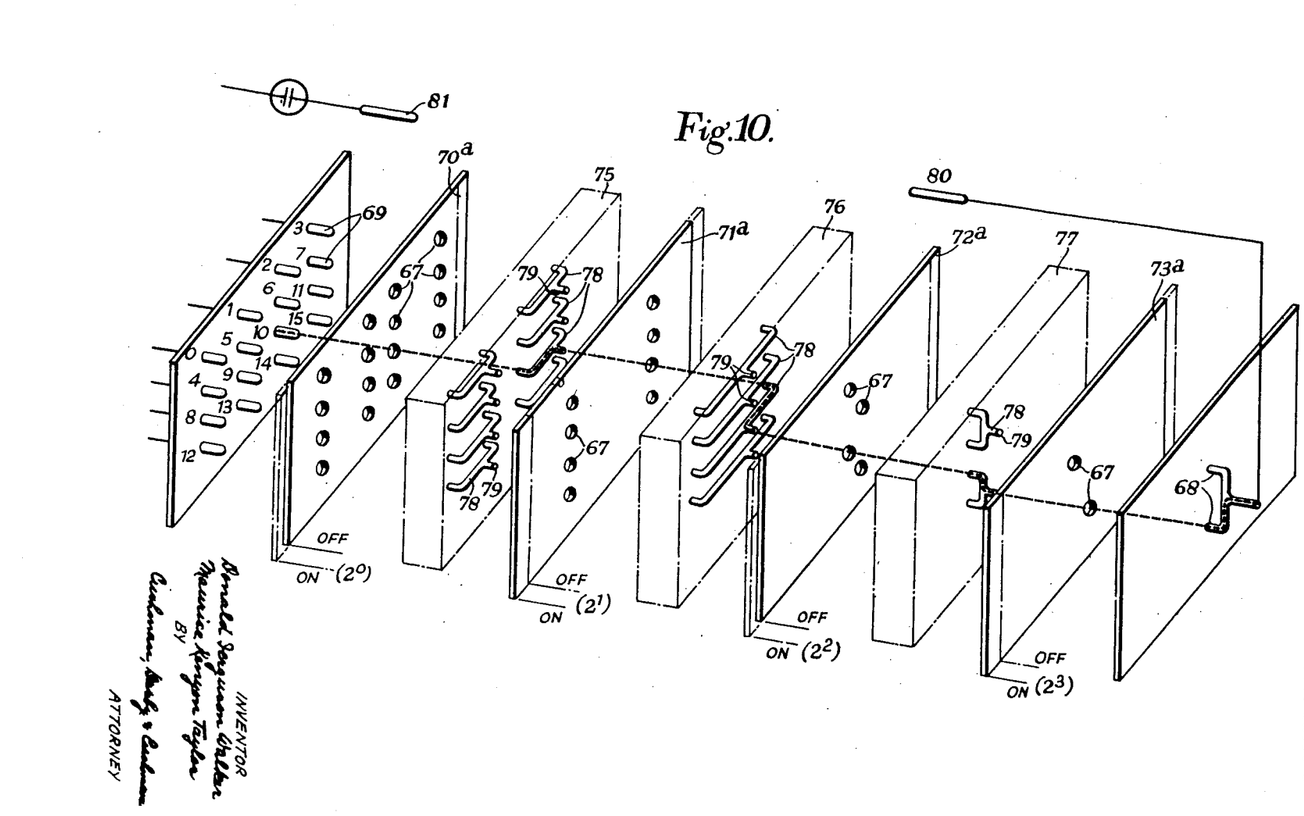
Fig. 10 is an exploded perspective view of another modified construction of decoding device.

Fig. 10 illustrates one embodiment of this kind in which there is inserted between each adjacent pair of the movable power-representing plates $70a$, $71a$, $72a$ and $73a$ a layer of insulation containing a sufficient number of pairs of conductors each converging from paired form on one side of the plate to singular form on the other side of the plate.

Thus, as shown, between the $2^0$ and $2^1$ power-representing plates $70a$ and $71a$ there is arranged an insulating separator $75$ carrying a plurality of converging conductors $78$ by which two (adjacent odd and even numbered) conductors on one face of the separator are converged into a single conductor $79$ on the opposite face of such separator. The power-representing plate $71a$ accordingly need be provided with only half the number N of apertures $67$ provided in the plate $70a$ and the positions of these apertures will be determined by the allotted positions of the respective common conductors $79$. Similarly, between the $2^1$ and $2^2$ power-representing plates $71a$, $72a$, a further insulating separator $76$ is arranged to have a plurality of converging conductors $79$ providing N/2 conductors on the side facing the plate $71a$ and converging in pairs to form N/4 conductors on the side facing the plate $72a$ which therefore need have only N/4 apertures. A further insulating separator $77$ between the $2^2$ and $2^3$ power-representing plates $72a$, $73a$ again reduces by half the number of electrodes and discharge paths until, at the last plate $73a$, only two spark-discharge paths remain to be commoned by a double-element electrode $68$ which is connected to the supply source as in the earlier embodiments.

It has been assumed above that the number N is a power of the radix 2 in the binary scale of notation employed since this represents the most effective arrangement. When N is odd only $(N-1)/2$ pairs of conductors can be converged between the $2^0$ and $2^1$ plates the Nth conductor remaining uncombined with any other at this stage. As in the case where the initial number N is even but not a multiple of 2 combination of odd numbered conductors will need to be deferred until a later stage. Whatever the number of conductors represented by N and whatever the number of powers employed, it will be found that the N spark-gap electrodes on one side of the layered assembly can be reduced to two on the other side.

Where the spark gap electrodes are arrayed in close formation and/or where a considerable number of stacked power-representing plates have to be employed it is possible for the resistance of a tortuous path through various apertures in successive plates which are not in alignment to be comparatively little greater than that of a proper discharge path through aligned holes so that, if all the direct paths are closed for some reason a tortuous path may be forced with erroneous signalling as a result. As a safeguard against such an occurrence, particularly applicable to arrangements in which the zero digit is not signalled, it is desirable to provide a relief or safety discharge path whose resistance is greater than that of a direct path but less than that of a tortuous path. The auxiliary electrodes $80$, $81$ in Fig. 10 perform such a function, their mutual spacing being slightly greater than that of the equivalent gap length through the plates $70a$ ... $73a$. The electrode $81$ is not, of course, connected to any receiver conductor but it may be connected to the H. T. source through indicating means such as a neon lamp $82$ to serve as a visual warning. Alternatively such a spark-gap could be used to indicate a zero signal even though it is not signalled.

Instead of utilising flat plates as so far described the various power-representing plates (and any intermediate separator or combining plates) may be constituted by cylindrical or part-cylindrical members arranged coaxially with one another in the manner illustrated in Fig. 11. In this embodiment, which otherwise closely resembles those of Figs. 1–6, the various digit-representing dispositions (and a separate "off" position if required for zero-digit signalling) are provided moving the cylinders to different angular positions by suitable electro-magnetic means such as magnet coils $83$, $84$, $85$ operating on armatures $86$, $87$ and $88$ respectively. In another alternative the cylinders may be slid axially.

In the example so far given the scale of notation is that of the binary scale, i. e. with radix 2. Other scales, however, may be adopted with arrangements similar to those which have already been described apart from a suitable increase in the number of digit positions of each plate or cylinder to accord with the radix number involved. Where $n$ is the radix of the scale there are, in each set, either $n$ different positions representing the digits of from zero to $(n-1)$ or only $n-1$ positions representing the digits 1 to $n-1$, the zero digit not being signalled in this latter instance.

Figure 12:
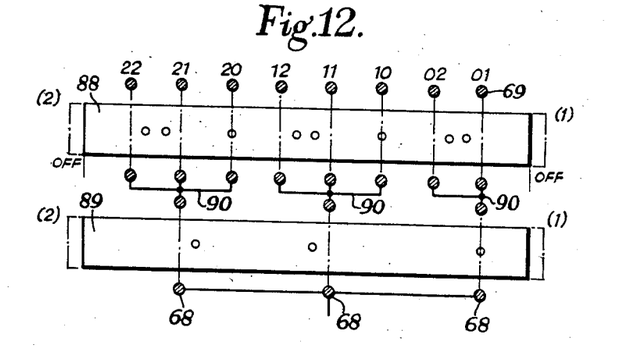
Fig. 12 is a developed view of the various power-representing plates of a decoder device operating with the ternary scale of notation.

An arrangement operating with the ternary scale may (assuming that the zero digit is not signalled) resemble constructionally that already described in connection with Fig. 7 where each plate has three positions. One of the solenoids is arranged to be energised for representing the digit "1" in respect of the particular power and the other solenoid for representing the digit "2" in respect of the same power. The two-way spring $66a$ operates to locate each plate in a central (zero-digit representing) position. The apertures $67$ are provided as before either by punching suitable through holes for each combination of the plates or, alternatively, as shown in diagrammatic form in Fig. 12 by suitable aperture combinations in plates $88$, $89$ with interposed groups of converging conductors $90$. The converging conductors $90$ in this case, being in groups of three commoned to form one conductor.

With a view to reducing trouble due to accidental spark discharges through tortuous paths involving apertures which are not in alignment it is convenient and desirable to reduce as far as possible the number of successive power-representing plates through which any chosen operative discharge path may have to pass for the reason that the length of the air gap which has to be broken down by the spark discharge is reduced to a greater extent with such reduction of series gaps than is the length of the undesired tortuous paths. The use of a notation scale having higher radix number $n$, for instance, the quaternary scale, i. e. of radix 4, is advantageous for this purpose since, in addition to reducing the number of power-representing plates, it is possible to space the electrodes more widely, particularly when converging intermediate conductors are employed. A further embodiment of decoder according to the invention utilising such quaternary scale will now be described in some detail.

Figure 13:
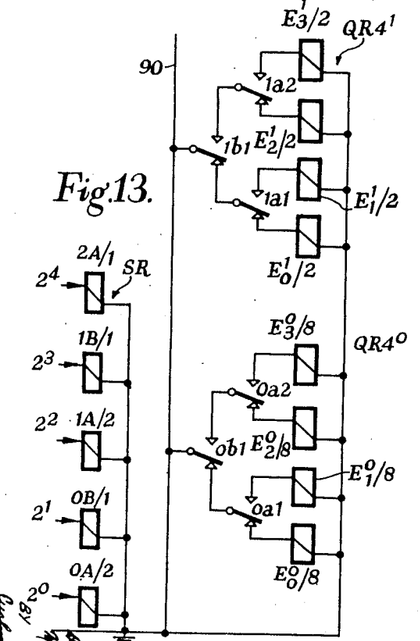
Fig. 13 is a circuit diagram of a binary to quaternary code converter.

It is convenient to retain the binary scale of notation for the actual signal transmission from the transmitter to the receiver in view of the simple two-state or on/off modulation which can be employed. In consequence a binary to quaternary code converter must also be provided and this will first be described with reference to Fig. 13.

This converter device comprises a group of incoming signal operated relays SR, one for each channel. The operating currents for these relays is derived either from means such as the filter circuits 54 of Fig. 3 or over individual communication channels from the transmitter.

These relays are indicated at 0A/2, 0B/1, 1A/2, 1B/1 and 2A/1 for dealing respectively with the binary powers $2^0, 2^1 \ldots 2^4$. The presence of a signal on any one of the individual input leads indicates unit digit value of that power and causes energisation of the corresponding relay. Zero digit value is not signalled in the binary section of this converter. The various related relay contacts are numbered in the conventional manner and are all shown in this figure in the position they occupy when the relay is in its de-energised condition.

The various contacts of the relays 0A/2, 0A/1, 1A/2 and 1B/1 of the group SR control the supply of energising current over lead 90 to 8 further relays arranged in two groups $QR4^1$ and $QR4^0$ dealing respectively with the quaternary powers $4^0$ and $4^1$. The first group comprises the relays $E_0^0/8$, $E_1^0/8$, $E_2^0/8$ and $E_3^0/8$. With this nomenclature the upper suffix figure indicates the quaternary power involved and the lower suffix figure indicates the digit multiple concerned while, as usual, the added numeral indicates the number of operated contacts. The second group similarly comprises the four relays $E_0^1/2$, $E_1^1/2$, $E_2^1/2$ and $E_3^1/2$.

The fifth relay 2A/1 of the group SR is, in this instance where only 32 numbers instead of the theoretical maximum of 64 are being signalled, used to control switching directly in the quaternary selecting section of the converter. If full capacity is required there will be a third bank of E relays, constituting a group dealing with the power $4^2$, controlled by this relay with accompanying modification of the circuits of and number of contacts controlled by the other relays of the E group.

With the arrangement shown any one of 32 numbers, initially signalled in the binary code on five input leads or channels, may be ultimately represented by the energisation of one only of the relays in each of the two groups $QR4^0$ and $QR4^1$ and the state of SR relay 2A/1. Thus, the presence of an input signal corresponding to the decimal number 13 represented by binary signals corresponding to powers $2^3$, $2^2$ and $2^0$, will cause energisation of SR group relays 1B/1, 1A/2 and 0A/2. These in turn will alter the controlling contacts of the second group of 8 relays so that relays $E_3^1/2$ (representing $3 \times 4^1$) is energised through contacts 1b1 (operated) and 1a2 (operated) whereas relay $E_1^0/8$ (representing $1 \times 4^0$) is energised through contacts 0b1 (normal) and 0a1 (operated). Whenever relay 2A/1 is operated it represents $1.4^2$.

Figure 14:
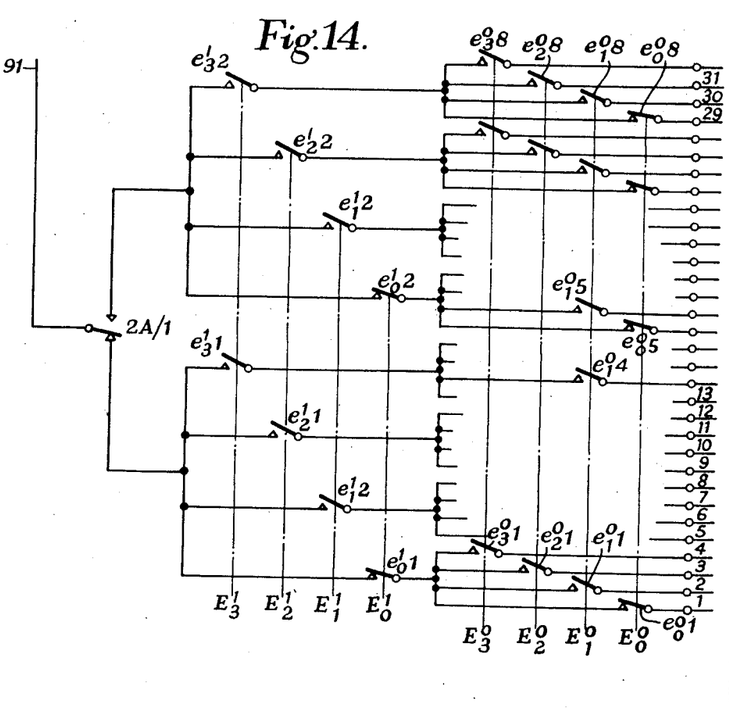
Fig. 14 is a circuit diagram of an electric switch equivalent to the quaternary decoder of Figs. 15 and 16.

Before describing in detail the construction of the layered power-representing plate arrangements for control by the various E relays noted above, it will be convenient first to describe an equivalent electrical contact arrangement which is shown in Fig. 14. In this figure the various E relays are shown as controlling associated contacts with the group $E_0^0$, $E_1^0$, $E_2^0$ and $E_3^0$ controlling the final outlet to a total of 32 separate conductors numbered 0 . . . 31 and the relay group $E_0^1$, $E_1^1$, $E_2^1$ and $E_3^1$ controlling the outlet to separate groups of four of the contacts of said first or $E^0$ relay group, the input to said $E^1$ relay group being divided into two groups of four by way of a single changeover switch which is that operated by the relay 2A/1 energised by signals in the $2^4$ input binary signal channel.

As will be seen from such an arrangement, selective energisation of the 2A/1 relay and one in each of the $E^0$ and $E^1$ groups will provide an outlet to one only of the 32 output lines. Taking the previous example where decimal number 13, signalled in binary code as $1.2^3$, $1.2^2$ and $1.2^0$, caused energisation of relays $E_3^1/2$ and $E_1^0/8$. Under these conditions, the supply lead 91 will be connected through contacts 2A/1 (normal), thence through contacts $e_3^1$1 and so through contacts $e_1^0$4 to the required conductor 13.

Figures 15, 16:
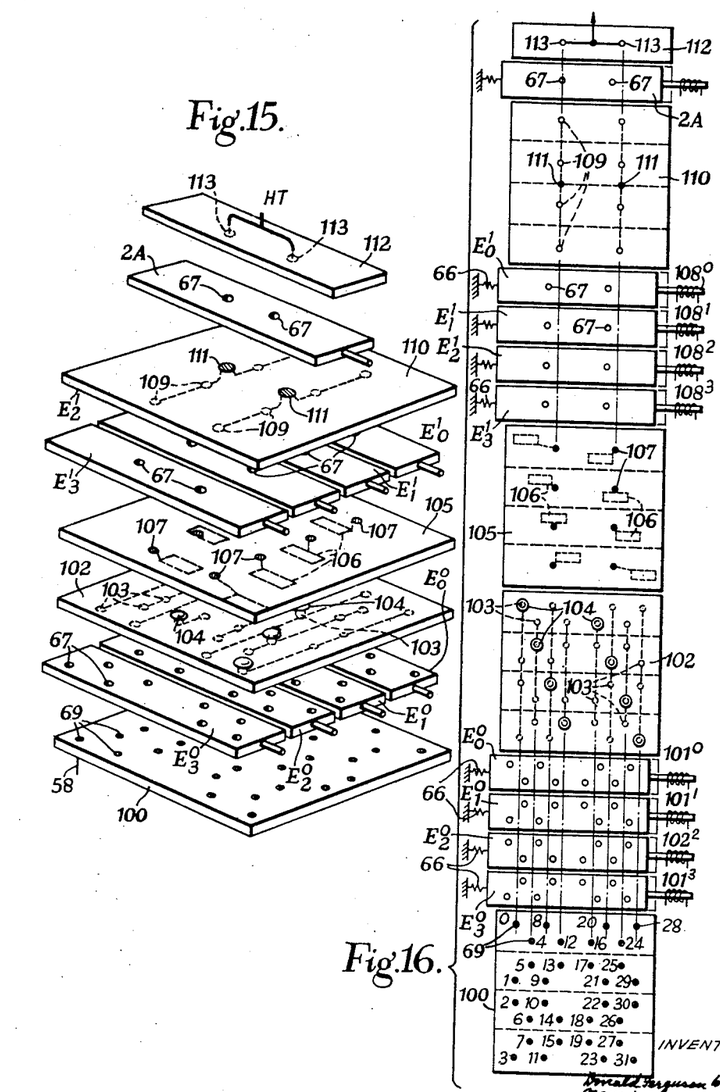
Fig. 15 is an exploded perspective view of a layered plate translating or decoder device according to the invention adapted for operation with the quaternary scale of notation.
Fig. 16 is a developed view of the various layer elements of the device of Fig. 15.

Fig. 15 shows the construction of the equivalent layered spark-gap assembly and comprises a plurality of separate movable plate layers with interleaved stationary layers carrying the required converging conductors for bringing a plurality of spark-gaps through one plate into one continuation gap through the next plate.

The device comprises a lowermost fixed plate 100 having a plurality of spark-gap electrodes 69 individual to each separate conductor 58. These electrodes are covered by four separate side by side digit-representing plates $E_0^0$, $E_1^0$, $E_2^0$ and $E_3^0$ each provided with 8 apertures 67 and controlled by individual electro-magnetic means, such as the solenoids 101⁰, 101¹, 101² and 101³ and each slidable longitudinally between an "off" position (shown more clearly in Fig. 16) where all the apertures are out of alignment with the related electrodes 69 and an "on" position where such apertures are aligned with their related electrodes. The plates are normally held in the "off" position by suitable means such as the spring 66. It will be noted that each plate deals selectively with its own area of the lowermost electrode grouping and is equivalent to the correspondingly numbered relay in Fig. 14. Upon this first power-representing layer is stacked a fixed insulating separator plate 102 having on its undersurface a plurality of counter electrodes 103 registering, in the axial direction of the stack, one with each of the electrodes 69, on the lowermost plate 100. These lower counter electrodes are commoned in rows of four successively numbered electrodes, e. g. 0, 1, 2 and 3 and each commoned row is connected to an individual contact plate 104 on the upper surface of the plate 102. Upon this plate is stacked a further fixed separator plate 105 having on its undersurface eight contact plates 106, one for registering with each of the contact plates 104 on the next lower separator plate 102. These contact plates 106 are each electrically connected to corresponding electrodes 107 on the upper surface of the plate 105, said electrodes being arranged in two rows as shown in Fig. 16. Upon this plate 105 are arranged the next power-representing layer constituted by four side-by-side plates $E_0^1$, $E_1^1$, $E_2^1$ and $E_3^1$ each again dealing with separate zones and each including two apertures 67 which, in the normal or "off" position of each plate, are out of register with the electrodes 107 on the plate 105 immediately below them. Like the plates $E_0^0$ ... $E_3^0$, these plates $E_0^1$ ... $E_3^1$ can each be moved individually by means such as the solenoids 108⁰, 108¹, 108², and 108³ shown, against the action of a spring 66 into an "on" position where the apertures 67 therein are in register with the lower electrodes 107 and with a further counter electrode 109 for each lower electrode, carried on the undersurface of a further fixed separator plate 110 of the stack disposed immediately above the movable power-representing plates $E_0^1$ ... $E_3^1$. The four counter electrodes 109 of each row are commoned and connected to a single electrode 111 on the upper surface of the plate 110, the two single electrodes being aligned for co-operation with a further movable power-representing plate 2A having two apertures 67 therein, one of which is in line with one of the single electrodes 111 when the plate is in its "off" position and the other of which is aligned with the other of the single electrodes 111 when the plate is in its "on" position. On this further single power-representing plate, which corresponds to the relay 2A/1 of Fig. 14, is arranged a further fixed plate 112 carrying two counter electrodes 113 which are commoned and are connected to the high-tension supply source, e. g. the H. T. supply 52 of Fig. 3.

The operation of this embodiment will be self-evident from the description already given of the binary spark gap devices and the electrical equivalent of Fig. 14.

Figure 17:
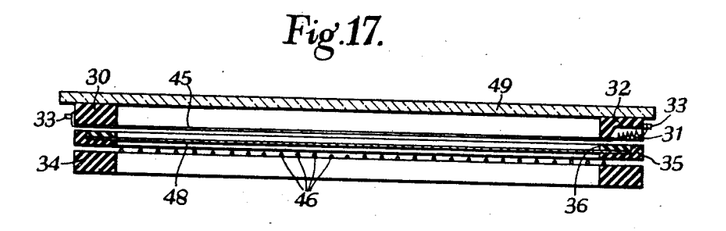
Fig. 17 illustrates in longitudinal cross section one constructional form of recording device according to the invention.

Fig. 17 illustrates in greater detail one constructional form of the recording device of Fig. 3. In this embodiment the various $x$ and $y$ conductors 45, 46 are constituted by fine gauge wires. The wires 45 are secured in parallel and in the same plane by being strained across the lowermost face of a rectangular frame 30 of insulating material. The wires are anchored at their opposite ends on terminal pins 33 while for the purpose of maintaining the wires in tension a portion of each wire near one end is coiled into spring-like form as shown at 31. This portion is conveniently housed in small recesses 32. The wires 46 are similarly mounted across the upper face of a second insulating frame 34.

The two frames 30, 34 are mounted in close spaced parallel planes with a suitable separation distance of, say, ⅛ inch between the respective $x$ and $y$ conductors. A third readily removable frame 35 of insulating material serves to carry and locate between the two arrays the sheet 48 of responsive material. This sheet is conveniently held in position by a removable clamping frame 36 to permit change of the recording sheet.

Figure 18:
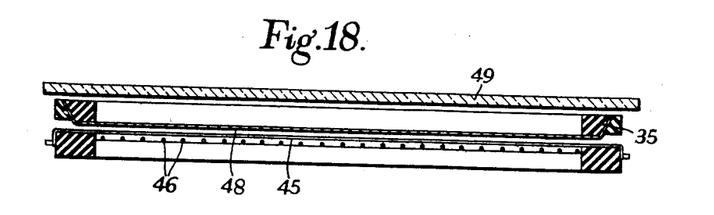
Figs. 18 and 19 illustrate, in similar manner to Fig. 17 two alternative constructions of recording device.
Figure 19:
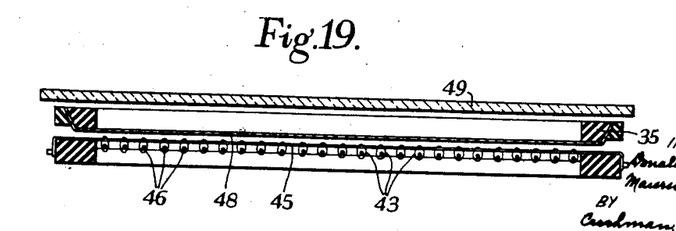

In the alternative constructions of Figs. 18 and 19 the sheet 48 of responsive material, mounted in a supporting frame 35 is mounted outside the conductor assembly but closely parallel to one of the arrays, e. g. the $x$ conductors 45. In the embodiment of Fig. 18, the reaction of the responsive material may be to the heat or to the secondary effect of a discharge between the conductors. In the embodiment of Fig. 19 the responsive material reacts to the heat generated by the passage of current from a selected $x$ conductor 45 to a selected $y$ conductor 46 through intervening beads 43 of highly resistive material formed around each intersection of the $x$ and $y$ conductors.

The particular embodiment of the invention using a reference system of rectangular co-ordinates constitutes only one of many applications of the invention. The reference system may be other than that of rectangular co-ordinates. It may for instance be that of polar co-ordinates; in which case one array of conductors in the receiver is in the form of concentric circles and the other array in the form of radii to those circles. It may be a hyperbolic reference system of the well-known type used in radio navigation; in which case the conductors are bent to the shape of hyperbolas, those in each array being confocal. The reference surface need not necessarily be planar; it may be spherical, where for example the reference system is that of latitude and longitude; or it may constitute part of the curved surface of a cylinder, as in the case of an indicator diagram. Where the conductors are not straight it is usually necessary to provide some means of supporting them; in some cases the sheet of responsive material may be made rigid enough to do this itself. The invention may also be used for recording typographical or other symbols, diagrams (e. g. indicator diagrams), graphs, waveforms (e. g. of the amplitude/time type), or the like, each of these being traced out by successively recorded points. A further use of the invention is as the receiver of a facsimile transmitting system.

Figure 20:
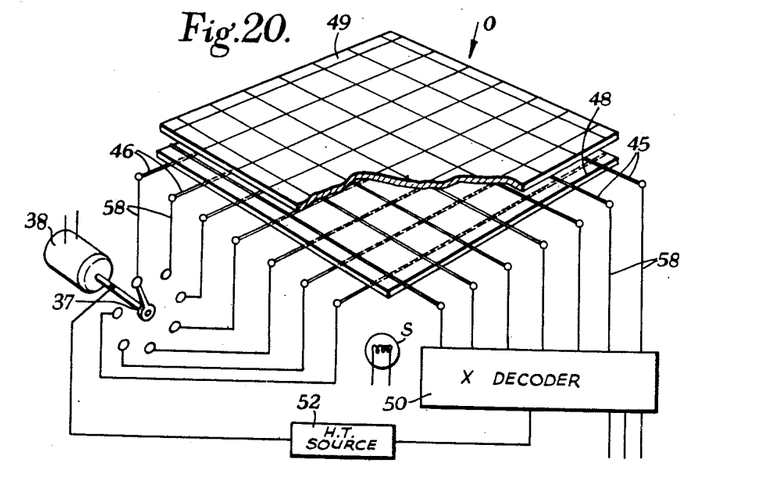
Figs. 20 and 21 are schematic perspective diagrams of further recording arrangements.
Figure 21:
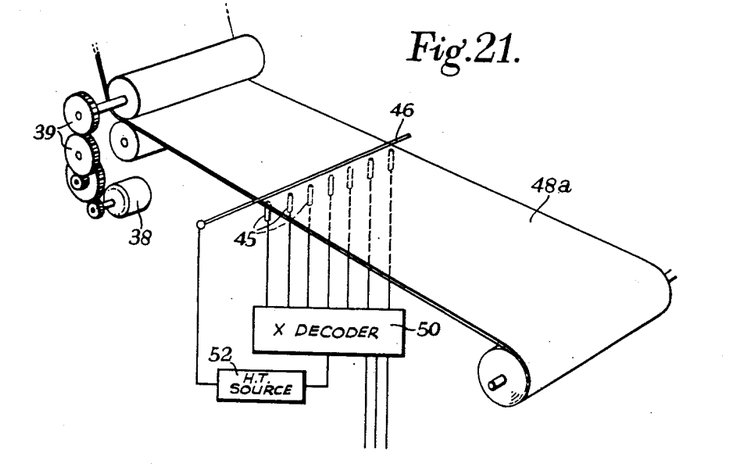

The means for energizing simultaneously the two conductors representing the curves whose intersection defines the position of the point or object may take very varied forms, including a simple switching arrangement for selectively energizing the conductors from a local HT source. Where the device is required to record a waveform of the amplitude/time type the conductors of one array—e. g. the $x$ conductors 45—are, as shown in Fig. 20, arranged to be connected sequentially to one pole of the HT source 52 in accordance with the instantaneous value of the amplitude signalled through the X decoder 50 whilst the conductors 46 of the other $y$ array are connected sequentially to the other pole of the source 52 at equal time intervals of a chosen time scale determined by rotary switch 37 operated by a synchronous electric motor 38. Alternatively the other pole of the source 52 may be connected continuously to a single $y$ conductor 46 as shown in Fig. 21 and the necessary time scale produced by moving the responsive sheet in strip form, steadily at the appropriate speed in a direction normal to this conductor by means of an electric motor 38 operating through gearing 39.

The sheet of responsive material may also take numerous forms. The one already described reacted to the heat of the spark discharge. This arrangement might be very simply modified by illuminating the sheet from the opposite side to that of the observer as shown in Fig. 20; each point now shows as a light spot on a dark background. Where the sheet is illuminated from the observer's side a tinted paper may be used so that the melting of the wax allows the tint to appear over the area of the spot. The material may be paper etc. chemically treated so as to change colour on being heated, in which case the wax impregnation is not needed; in a similar category is material such as cellophane which, normally transparent, becomes opaque or at any rate translucent rather than transparent when heated.

The material may be electrically conductive, though of high resistance, so that the current from one conductor to the other flows through the material instead of passing as a spark discharge. In this case the material may be such as to respond to electrolytic action; its high resistance confines this and the resulting visible reaction to the immediate neighbourhood of the point of intersection of the sheet and the common perpendicular between the two energised conductors. Alternatively, the material may react to the heat set up by the current flowing through it.

The reaction of the material may be in response to its being burnt or punctured by a spark-discharge between the conductors. An opaque paper may be used, illuminated on either the observer's side or the other side only, thus giving the appearance of a dark spot on a light background or a lighter spot on a dark background respectively. Where the paper is at all combustible it may be treated chemically to confine the burnt or punctured area.

Where the responsive material is such as to react differently, or to different extents, to different energising voltages on the conductors, or to the same voltages applied for different times, the device may be used to record on one sheet points of more than one series, e. g. so as to form traces or waveforms representing different intelligence. All that is necessary is to arrange that all the points of each series are produced by energising voltages of the same value, or applied for the same time, as the case may be, this value or time being individual to the series concerned. A suitable material for this use is a waxed tinted paper; the wax melts to a different extent in response to spark discharges of different intensity and thus produces spots of different colour intensity.

Where the material is opaque and is located between the two arrays of conductors so as to be punctured by the discharge, discrimination between the points of two series may be afforded by illuminating both sides of the material. The points belonging to the series formed by the application of the greater voltage, or the voltage applied for the longer time, are holes of comparatively large area which appear bright because of the illumination of the side of the sheet remote from the observer. The points of the other series appear as predominantly dark spots, or spots coloured according to the tint of the paper or other base material (where such tinted material is used), under the illumination from the observer's side of the sheet.

By arranging in a series of parallel planes a number of devices as first described a three-dimensional display may be provided. In this case the responsive material for each device must be normally transparent and react by becoming opaque or translucent. A material such as cellophane is suitable.

We claim:

1. A signal translating device for deriving a response individual to any one of a series of N numbers from signals representing by separate characteristics the component powers and digits of that number expressed in a predetermined scale of notation of radix $n$ which comprises a layered assembly of power-representing plates of insulating material, there being one plate layer for each power of said scale required for the representation of all of said numbers and each plate layer having as many different digit representing dispositions each corresponding to a coefficient of the particular power as are necessary to identify the different numbers in the scale, disposition-adjusting means for each plate layer for causing each component of said signals which represents a digit to adjust to the disposition representing that digit the plate layer representing the power of which that digit is the multiple thus allowing each of said numbers to be represented by a different one of N different combinations of said positions of said plate layers, in each of said plate layers a plurality of apertures so located with respect to the apertures in the adjacent plate layer or layers that each of said combinations defines through successive apertures, one in each plate layer, a series of spark-discharge gaps individual to that combination and deemed to represent the number represented by that combination, an array of N electrodes, a high resistance discharge path individual to each electrode, a sheet of recording material arranged to respond to a discharge through said individual high-resistance discharge paths, a source of high tension current and means for connecting a selected series of spark-discharge gaps set up by each combination of said plate layers in series with an appropriate one of said high-resistance discharge paths.

2. A signal translating device according to claim 1 which includes between at least two adjacent ones of said power-representing plate layers, at least one group of converging conductors so disposed relative to the apertures in said adjacent plate layers as to form part of the discharge paths through any one of a predetermined number of holes in one of said two adjacent plate layers and to combine such discharge paths into one passing through one aperture in the remaining one of said two adjacent plate layers.

3. A signal translating device according to claim 2 in which said group of converging conductors is carried by an additional and fixed plate of insulating material interleaved into said layered assembly of power-representing plate layers.

4. A signal translating device according to claim 3 in which each plate layer comprises a plurality of separate plates in side-by-side relation, there being one plate for each of the digits required for the expression of the different multiples of the particular power represented by that plate layer.

5. A signal translating device according to claim 1 in which each plate layer comprises a plurality of separate plates in side-by-side relation, there being one plate for each of the digits required for the expression of the different multiples of the particular power represented by that plate layer.

6. A signal translating device according to claim 1 wherein each of said power-representing plate layers is movable between different ones of at least three different digit-representing positions by said disposition adjusting means.

7. A signal translating device according to claim 1 wherein the radix $n$ of said scale of notation is greater than 2 in combination with a code-converting device by which signals in the binary code of notation are converted to signals in the scale of notation having said radix $n$ of the signal translating device.

8. A signal translating device according to claim 1 in combination with an electrical recording device comprising an array of separate electrical conductors, at least one further conductor intersecting the conductors of said array so as to provide high resistance discharge paths therebetween, an electric current source, means for effecting energisation of said further conductor and a chosen one of said separate conductors through a circuit completed by a chosen one of said combinations of spark gaps through the insulating plate layers of said signal translating device and in series through one of said high resistance discharge paths between said further conductor and said chosen conductor at their point of intersection and a sheet of responsive material closely adjacent said array of conductors, said material being so constituted as to react visibly to the flow of said current at said point of intersection.

9. An electrical recording device according to claim 8 wherein said sheet of responsive material is disposed in between said two arrays of conductors and the reaction thereof is confined to the immediate neighbourhood of the point of intersection of said sheet and the perpendicular common to said energised conductors.

10. An electrical recording device according to claim 9 wherein said sheet of responsive material is disposed outside said assembly of conductors and closely parallel to one array thereof and the reaction thereof is confined to the immediate neighbourhood of the point of intersection of said sheet and the perpendicular, produced to meet said sheet, which is common to both said energised conductors.

11. An electrical recording device according to claim 8 wherein said sheet of responsive material is of a character such that said visible reaction is caused by heat.

12. A signal translating device for deriving a response individual to any one of a series of N numbers from signals representing the component powers and digits of that number expressed in a predetermined code of notation of radix $n$ which comprises a layered assembly of power-representing plates of insulating material, there being a plate layer for each power of said code required for the representation of all of said numbers and each plate layer having as many different digit-representing dispositions each corresponding to a different coefficient of the particular power as are necessary to identify the N different numbers in the scale, disposition-adjusting means individual to each plate layer responsive to that component of said signals which represents a particular coefficient of a particular power to adjust to the disposition representing that coefficient the plate representing that power thus allowing each of said numbers to be represented by a different one of N different combinations of said positions of said plates, in each of said plates a plurality of coding apertures, between at least two adjacent apertured plate layers a group of conductors which provide alternative conducting paths according to the disposition of the respective plates from at least two different apertures in one plate layer to a single aperture in the next plate layer, the apertures in the several plate layers being so located that each of said N combinations of plate positions defines through successive apertures one in each plate layer and through said conductor or conductors a single spark-discharge path individual to that combination and deemed to represent the number represented by that combination, and electric circuit completing means whereby the setting-up of each spark-discharge path by said signals completes an electrical circuit for giving an indication of or a response individual to the number represented by that path.

13. A signal translating device according to claim 12, wherein the plate layers are arranged in ascending powers of $n$ and the conductors provide alternative conducting paths between not more than $n$ apertures in a plate layer of a lower power and a single aperture in a plate layer of the next higher power.

14. A signal translating device according to claim 12 wherein the N numbers are designated according to the ternary scale and the plate layers represent ascending powers of 3 and the conductors provide alternative conducting paths between not more than three apertures in a plate layer of a lower power and a single aperture in a plate layer of the next higher power.

15. A signal translating device according to claim 12 wherein in the case where the received signals include signal components representing two different coefficients of the same power, the disposition adjusting means comprises means responsive to said respective signal components to move the particular power-representing plate from a neutral position to either one of two signalling positions according to which of said signal components is present.

16. A signal translating device according to claim 12 wherein the received signals include signal components representing more than two different coefficients of the same power, and the plate layer representing that power comprises a plurality of co-planar plates each independently displaceable by separate adjusting means responsive to the said respective signal components.

17. A signal translating device according to claim 12 responsive to signals representing N different numbers by signal components each representing a different one among more than two different coefficients of at least one power of a radix $n$ greater than 2 and including code converting means for converting received signals representing the said N different numbers by signal components indicative of ascending powers of 2 into said signal components representative of the code of radix $n$, said converting means having an input channel for each of said powers of 2 and a greater number of output channels one for each of the respective coefficients of the different powers of $n$ and relay means for selectively energizing, upon receiving a group of component signals representing one of said N numbers in the binary code, a group of said output channels integrally representing said number in the code of radix $n$, said output channels individually controlling the disposition adjusting means for the plate layers of the corresponding powers.

18. A signal translating device according to claim 17, comprising a plurality of apertured plate layers each representative of a power of the higher radix $n$, at least one of said plate layers comprising a plurality of individual plates each representative of a different coefficient of the same power and individually responsive to disposition-adjusting means energized through respective ones of said output channels of the code converting means.

19. A signal translating device according to claim 18 wherein the code converting means is adapted to convert signals representing the numbers of the binary code into signals representing the same numbers in the quaternary code, and said layered assembly of power representing plates includes at least one layer comprising four coplanar apertured plates each representing a different coefficient of the same power of the radix 4, said plates being individually adjustable in response to the receipt of signals indicative of said coefficients of that power from the code converting means.

20. A signal translating device according to claim 12 wherein said power-representing plates are arranged as co-axial cylindrical surfaces.

21. A signal translating device according to claim 20, wherein said co-axial cylindrical surfaces are independently movable about the common axis by disposition adjusting means individual to each cylindrical surface.

22. A signal translating device for deriving a responsive individual to any one of a series of N numbers each represented by a group of signal components each indicative of a coefficient of a power in the binary code of notation, and comprising code converting means for converting each signal group representing a binary number into a second signal group representing the same number in a numerical code of radix $n$ greater than 2, a layered assembly of adjustable power representing plates of insulating material, there being one plate layer for each power of said higher code required for the representation of all of said numbers and at least one of said plate layers comprising two or more component plate elements in co-planar relation each of said plate layers or plate elements representing by virtue of its adjustability at least one of the different coefficients of that power of $n$ belonging to that plate layer, disposition-adjusting means for each plate layer for causing each component of said second signal group which represents a coefficient of a power of $n$ to adjust to the disposition representing that coefficient the plate layer or the appropriate plate element in the plate layer thus allowing each of said numbers to be represented by a different one of N different combinations of said positions of said plate layers or plate elements, in each of said plate layers a plurality of coding apertures so located with respect to the apertures in the adjacent plate layer or layers that each of said combinations defines through successive apertures, one in each plate layer, a single spark-discharge path individual to that combination and deemed to represent the number represented by that combination, and electric circuit completing means whereby the setting-up of each spark-discharge path by said signals completes an electrical circuit for giving an indication of or a response individual to the number represented by that path.

23. A signal translating device for deriving a response individual to any one of a series of N numbers from signals representing the component powers and digits of that number expressed in a predetermined code of notation of radix $n$ which comprises a layered assembly of power-representing plates of insulating material, there being a plate layer for each power of said code required for the representation of all of said numbers and each plate layer having as many different conditions of adjustability in its own plane as there are coefficients of that power in the N numbers, disposition-adjusting means individual to each plate layer responsive to that component of said signals which represents a particular coefficient of a particular power to adjust to the disposition representing that coefficient the plate representing that power thus allowing each of said numbers to be represented by a different one of N different combinations of said positions of said plates, in each of said plates a plurality of coding apertures, electrically conductive means arranged between two adjacent plate layers to provide alternative conducting paths between $n$ apertures of a plate layer of a lower power and a single aperture of a plate layer of the next higher power according to the differently adjusted dispositions of the plate layers, the apertures in the several plate layers being so located that each of said N combinations of plate positions defines through successive apertures one in each plate layer and through said conductive means a single spark-discharge path comprising a chain of gaps individual to that combination and deemed to represent the number represented by that combination, and electric circuit completing means whereby the setting-up of each spark-discharge path by said signals completes an electrical circuit for giving an indication of or a response individual to the number represented by that path.

References Cited in the file of this patent

UNITED STATES PATENTS

| Number | Name | Date |
|---|---|---|
| 352,143 | Munson | Nov. 9, 1886 |
| 1,311,384 | Drew | July 29, 1919 |
| 1,350,334 | Radtke | Aug. 24, 1920 |
| 1,381,317 | Loughridge | June 14, 1921 |
| 1,547,964 | Semat | July 28, 1925 |
| 2,342,886 | Murphy | Feb. 29, 1944 |